US009832926B2

(12) United States Patent
Jung et al.

(10) Patent No.: US 9,832,926 B2
(45) Date of Patent: Dec. 5, 2017

(54) VIBRATION-DAMPING TRIGGERING OF AN ACTUATOR FOR AN AGRICULTURAL WORKING MACHINE

(71) Applicant: DEERE & COMPANY, Moline, IL (US)

(72) Inventors: Benedikt Jung, Kaiserslautern (DE); Philipp Muench, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 119 days.

(21) Appl. No.: 14/615,967

(22) Filed: Feb. 6, 2015

(65) Prior Publication Data

US 2015/0230403 A1    Aug. 20, 2015

(30) Foreign Application Priority Data

Feb. 19, 2014  (DE) ........................ 10 2014 203 005

(51) Int. Cl.
*A01D 41/127* (2006.01)
*A01D 75/00* (2006.01)
*A01C 23/04* (2006.01)

(52) U.S. Cl.
CPC .......... *A01D 41/127* (2013.01); *A01C 23/047* (2013.01); *A01D 75/00* (2013.01)

(58) Field of Classification Search
None
See application file for complete search history.

(56) References Cited

U.S. PATENT DOCUMENTS

| 4,414,792 A * | 11/1983 | Bettencourt ......... A01D 41/141 56/10.2 E |
| 4,924,943 A * | 5/1990 | Maichle ............. A01B 63/1006 172/1 |
| 5,704,200 A * | 1/1998 | Chmielewski, Jr. . A01D 41/141 56/10.2 E |
| 7,654,141 B2 * | 2/2010 | Behnke .............. A01D 41/1273 73/584 |

(Continued)

FOREIGN PATENT DOCUMENTS

| DE | 3446811 A1 | 7/1986 |
| DE | 3446811 C2 | 5/1992 |

(Continued)

OTHER PUBLICATIONS

European Search Report issued in counterpart application No. 15152105.1, dated Jul. 21, 2015 (5 pages).

(Continued)

*Primary Examiner* — Ryan Rink

(57) ABSTRACT

An arrangement for triggering an actuator for adjusting an adjustable element of an agricultural working machine comprises: a specifying device for generating adjustment commands for the adjustable element; a control arrangement for the actuator; and a signal-shaping unit which, upon receipt of an adjustment command, initially applies a first signal dependent on the adjustment command to the control arrangement, and then applies a second signal, which is dependent on the adjustment command and delayed in time relative to the first signal, the second signal leading to a reduction or cancellation of a natural oscillation generated by the first signal in the system consisting of working machine and element.

5 Claims, 2 Drawing Sheets

(56) References Cited

U.S. PATENT DOCUMENTS

| | | | |
|---|---|---|---|
| 2001/0033146 A1* | 10/2001 | Kato | B25J 9/1641 |
| | | | 318/568.22 |
| 2009/0277145 A1 | 11/2009 | Sauerwein | |
| 2013/0091819 A1* | 4/2013 | Deneault | A01D 41/141 |
| | | | 56/10.2 E |
| 2015/0305239 A1* | 10/2015 | Jung | A01D 41/141 |
| | | | 701/50 |

FOREIGN PATENT DOCUMENTS

| | | |
|---|---|---|
| DE | 10054285 A1 | 5/2002 |
| DE | 102010017459 A1 | 12/2011 |
| EP | 2591660 A1 | 5/2013 |
| EP | 2671439 A1 | 12/2013 |
| WO | 2008006730 A1 | 1/2008 |
| WO | 2008088916 A3 | 9/2008 |

OTHER PUBLICATIONS

An Adaptive Input Shaping Control Scheme for Vibration Suppression in Slewing Flexible Structures; Anthony Tzes, Stephen Yurkovich; IEEE Transactions on Control Systems Technology, vol. 1 No. 2, Jun. 1993.
A Frequency Domain Identification Scheme for Flexible Structure Control, Anthony Tzes, Stephen Yurkovich; Proceedings of the 27th Conference on Decision and Control, Austin, TX, 1968.

* cited by examiner

VIBRATION-DAMPING TRIGGERING OF AN ACTUATOR FOR AN AGRICULTURAL WORKING MACHINE

CROSS-REFERENCE TO RELATED APPLICATIONS

Pursuant to 35 USC §119, this application claims the benefit of and priority to German patent application no. 102014203005.6, filed on Feb. 19, 2014, which is herein incorporated by reference in its entirety.

TECHNICAL FIELD

The invention relates to an apparatus for triggering an actuator for adjusting an adjustable element of an agricultural working machine.

BACKGROUND

Agricultural working machines generally comprise elements that can be adjusted, i.e. displaced linearly, or pivoted relative to the working machine, by associated actuators. In the case of a tractor, such elements include implements attached to the front or rear power lifts for cultivation, sowing or for applying fertilizer or other chemicals; for a self-propelled field sprayer, they include a sprayer boom that is height-adjustable and/or pivotable about an axis extending in the forward direction; for a combine or forage harvester, they include a harvester head that is pivotable about a horizontal axis oriented transversely to the forward direction (generally the axis of rotation of the upper inclined conveyor roller or chopper drum) and/or pivotable about an axis extending in the forward direction for parallel orientation on a slope, or an ejection pipe of a forage harvester that is height-adjustable in order to adjust the height of its outlet pipe and/or is height-adjustable about the vertical axis. The target position of the actuator and thus of the adjustable element is specified by a user via a suitable interface or by an automatic controller interacting with sensors.

Because the working machine rests on wheels filled with air (and are thus resiliently yielding) and can also be furnished with a suspension between the wheels and the body of the working machine, the system consisting of the adjustable element and the working machine is stimulated into (natural) oscillation, which can have a disturbing effect in operation. Thus cutters can have a width of 12 m or more, and if they are guided a few centimeters above the ground, it is occasionally possible that a desired cutting height cannot be maintained due to the vibration resulting from the height adjustment.

In the prior art, control circuits are known which are equipped with a sensor for detecting the respective position of the adjustable element, the signal of which is used for feeding back the actual position of the element to a control circuit (cf. US 2009/0277145 A1, for example). In that way, any deviations from the target position caused by the vibration of the element that may occur are detected and are fed back to the control circuit, but are only damped relatively slowly.

It has also been proposed to detect possible causes, e.g. ground unevenness, for vibrations of an implement attached to an agricultural vehicle and to identify their influence on the attached implement in order to trigger the actuator to act in opposite phase to the expected cause of vibrations and thus avoid an undesired vibration of the element (DE 34 46 811 C2, DE 10 2010 017 459 A1). This procedure does not take vibrations resulting from changing the target position of the element into account and can therefore not counteract such vibrations.

SUMMARY

The present invention addresses the problem of providing an apparatus for triggering an actuator for adjusting an adjustable element of an agricultural working machine that enables a reduction of undesired vibrations of the element caused by the adjustment of the actuator.

The present invention is defined by the claims of the patent.

An apparatus for triggering an actuator for adjusting an adjustable element of an agricultural working machine comprises a specifying device for generating adjustment commands for the adjustable element, a control arrangement of the actuator coupled to the adjustable element, and a signal-shaping arrangement that cooperates with the specifying device and the control arrangement. Upon receiving an adjustment command, the signal-shaping device first applies a first signal, dependent on the adjustment command, to the control arrangement, and subsequently applies a second signal, which is delayed relative to the first signal and leads to reduction or cancellation of the natural vibration generated by the first signal in the system consisting of the working machine and the element.

In other words, the specifying device outputs adjustment commands for the adjustable element, e.g. for lowering, raising or pivoting, so that the adjustable element reaches a desired, new target position after executing the adjustment command. This adjustment command is fed to a signal-shaping arrangement that (generally not substantially delayed) outputs a first signal dependent on the adjustment command to a control arrangement, which in turn triggers an actuator (electrically if the actuator is an electric motor or hydraulically if the actuator is a hydraulic cylinder motor) with a first signal dependent on the adjustment command. The actuator thus moves the adjustable element to its target position in a desired direction predetermined by the adjustment command. In this process, the adjustable element and the working machine connected thereto can be set into an oscillation having a natural frequency predetermined by mechanical parameters of the system consisting of the working machine and the adjustable element, the amplitude of which would gradually decrease corresponding to a damping of the system. In order to damp this natural oscillation, the signal-shaping arrangement outputs a second signal, dependent on the adjustment command and time-delayed relative to the first signal, to the control arrangement. The second signal is dimensioned such that the element receives a mechanical pulse that cancels itself out with the initiated natural oscillation of the system consisting of the working machine and the element. Thereby the undesired oscillation of the element, or the system consisting of the working machine and the element, is reduced or even canceled out. The shape of the pulse depends on the temporal progression of the original adjustment command and, dependent thereon, can thus have any desired temporal progression.

The time delay of the second signal relative to the first signal corresponds in particular to half an oscillation period of the natural oscillation for the system consisting of the working machine and the element. Analogously, the amplitude of the second signal is preferably such that it cancels out the natural oscillation of the system consisting of the working machine and the element.

The signal-shaping arrangement preferably comprises an input connected to the specifying device and an output connected to the control arrangement, a first branch connected to the input and the output, which transmits the adjustment command with a first gain to the output, and a second branch, which routes the adjustment command through a signal delay unit and transmits it with a second gain to the output.

The first gain and/or the second gain and/or the time delay of the signal delay unit can be fixedly predetermined or can be determined by a determination device that defines the aforementioned parameters of the signal-shaping arrangement on the basis of data regarding a detected resonant frequency and/or a damping factor of the system consisting of the working machine and the element.

For this purpose, the determination device can be connected to a pressure sensor for detecting the pressure in a hydraulic cylinder provided as an actuator and/or to a sensor for detecting the movement of the element and/or an electrical sensor for detecting the electrical triggering (e.g. current, voltage or drive power) of an electrical actuator. Before the start of and/or during the operation of the working vehicle, the determination device can determine from the signals of the sensor the data regarding the resonant frequency and/or the damping factor of the system consisting of the working machine and the element.

Alternatively or additionally, signals regarding a tire parameter and/or ground parameter and/or a fill level of a container of the working vehicle, particularly a grain tank and/or a fuel tank, can be supplied to the determination device, and from the aforementioned signals, the determination device can derive or fine-tune the data regarding the resonant frequency and/or the damping factor of the system consisting of the working machine with the element.

The specifying device can produce the adjustment commands on the basis of output values of noncontact look-ahead sensors or sensors mechanically interacting with the ground, or from values derived from a map. In this regard, it can optionally also use the fill level of a container of the working vehicle, particularly a grain tank and/or a fuel tank, and/or a pressure sensor for detecting the pressure in a hydraulic cylinder provided as an actuator, and/or signals of a sensor for detecting the movement of the element.

In particular, the adjustable element is an implement attached to a front or rear power lift of a tractor (e.g. for cultivation, for sowing or for applying fertilizer or other chemicals, particularly a sprayer boom that is height-adjustable and/or is pivotable about an axis extending in the forward direction) and/or a height-adjustable sprayer boom of a self-propelled field sprayer or a sprayer boom that is pivotable about an axis extending in a forward direction, or a harvester head adjustable in the forward direction of a harvesting machine and/or transversely thereto, or a forage harvester ejection pipe that is adjustable about a vertical and/or horizontal axis.

BRIEF DESCRIPTION OF THE DRAWINGS

The detailed description of the drawings refers to the accompanying figures in which.

DETAILED DESCRIPTION OF THE DRAWINGS

Figure 1:
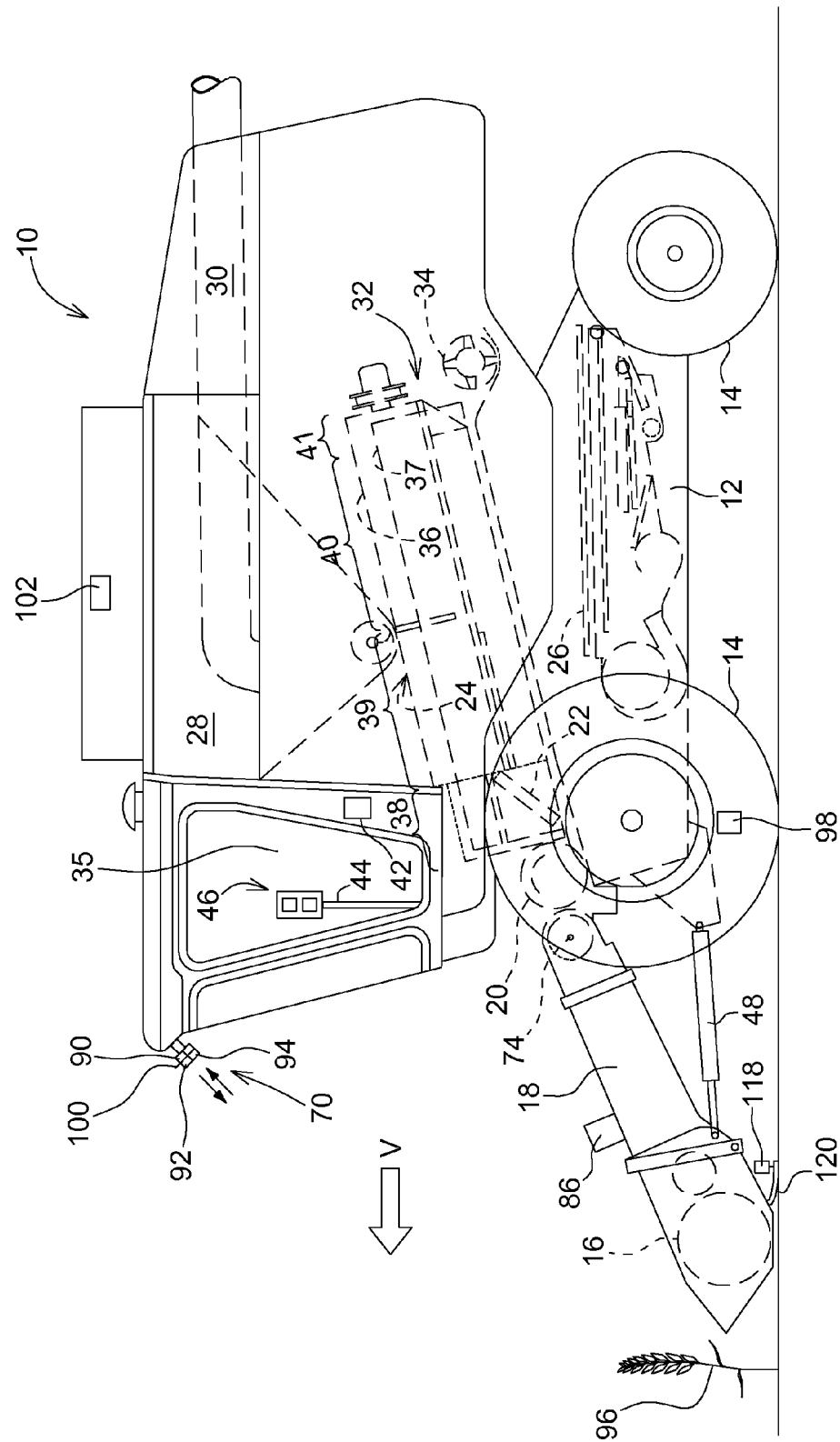
FIG. 1 shows a schematic side view of a working vehicle having an adjustable element.

FIG. 1 shows a self-propelled agricultural working machine 10 in the form of a combine having a supporting structure 12 that is engaged with wheels 14 situated on the ground. Although the working machine 10 is shown with wheels, it could also be furnished with two or four tracks. A harvester head 16 in the form of a cutter is used for harvesting crop and guides it to an inclined conveyor 18. The inclined conveyor 18 contains a conveying device in order to feed the harvested crop to a guide drum 20. The guide drum 20 leads the crop upward through an inlet transition section 22 and to a rotatable crop processing device 24 designed for threshing and separating. The illustrated crop processing device 24 is arranged axially in the combine, but it could also be arranged in different orientations relative to the longitudinal axis of the working machine 10.

In operation, the crop processing device 24 threshes and separates the harvested crop. The grain and the chaff fall through gratings on the bottom of the crop processing device 24 into a cleaning system 26. The cleaning system 26 removes the chaff and feeds the clean grain via an elevator (not shown) for clean grain. The elevator for clean grain deposits the grain in a grain tank 28. The clean grain in the grain tank 28 can be discharged by a discharge screw conveyor 30 onto a truck or a trailer.

Threshed straw that is free of grain is fed by the crop processing device 24 through an outlet 32 to an ejection drum 34. The ejection drum 34 ejects the straw at the rear end of the working machine 10. It should be noted that the ejection drum 34 could also feed the crop freed of grain directly to a straw chopper. The operation of the working machine 10 is controlled from an operator cab 35.

The crop processing device 24 comprises a cylindrical rotor housing 36 and a rotor 37 arranged rotatably in the rotor housing 36. The front part of the rotor 37 and the rotor housing 36 define a loading section 38. A threshing section 39, a separating section 40 and a discharge section 41 are arranged downstream of the loading section 38. The rotor 37 is furnished in the loading section 38 with a conical rotor drum that contains helical loading elements for reaching into the grain received from the guide drum 20 and from the inlet transition region 22. The threshing section 39 is located immediately downstream of the loading section 38. In the threshing section 39, the rotor 37 has a cylindrical rotor drum that is furnished with a plurality of threshing elements in order to thresh the crop obtained from the loading section 38. The separating section 40, in which grain still contained in the threshed crop is released and falls through a bottom grating in the rotor housing 36 into the cleaning system 28, is situated downstream of the threshing section 39. The separating section 40 transitions into the outlet section 41, in which the crop freed of grain (straw) is ejected from the crop processing device 24.

The height control of the harvester head 16, which is used in the present embodiment as an example of an adjustable element of the working machine 10, is accomplished by means of an actuator 48 in the form of a hydraulic cylinder that adjusts the inclined conveyor 18 with the harvester head 16 mounted thereon about the axis of rotation, arranged transversely to the forward direction V and horizontally to the upper deflection roller 74 of the inclined conveyor 18 and thus defines the distance between the harvester head 16 and the ground. The actuator 48 is controlled by means of a controller 42. The desired (target) height of the harvester head 16 is specified by means of a user interface 46 having keys that are mounted on the upper end of a drive lever 44, which is pivotably articulated and is used for specifying the propulsion speed of the working machine 10. In addition, a look-ahead sensor system 70 having a radar transmitter 92, a radar receiver 94 and an evaluation unit 90 is mounted on the roof of the cab 35, the radar transmitter 92 and the radar receiver 94 pivoting back and forth about an axis 100 in order to scan the field in front of the working machine 10 with rays that penetrate the plant growth 96 and to calculate anticipated values for the controller 42. A height sensor 118 interacting with a ground probe 120 also detects the actual height of the harvester head 16 above ground.

When changing the position and orientation of the harvester head 16 (e.g. raising and lowering, or lateral tilting in a different embodiment) in the prior art, excitation torques and excitation forces arise during changes of the position target value of the harvester head 16 and are transmitted to the working machine 10, which is supported on large-volume tires. Due to the large-volume tires, the system consisting of the working machine 10 and the harvester head 16 is excited to undergo mechanical oscillations, which negatively influence the precision of the height position and the tilting of the harvester head 16 relative to the ground. Depending on the nature of the excitation forces and torques, the harvester-harvester head unit is excited with oscillations of different frequency, attenuation and amplitude. Resonant frequencies of the harvester-harvester head unit are excited to a particularly large extent such that large natural oscillations can arise. These oscillations counteract the objective of a constant cutting height of the crop and worsen the result of the head height regulation.

Figure 2:
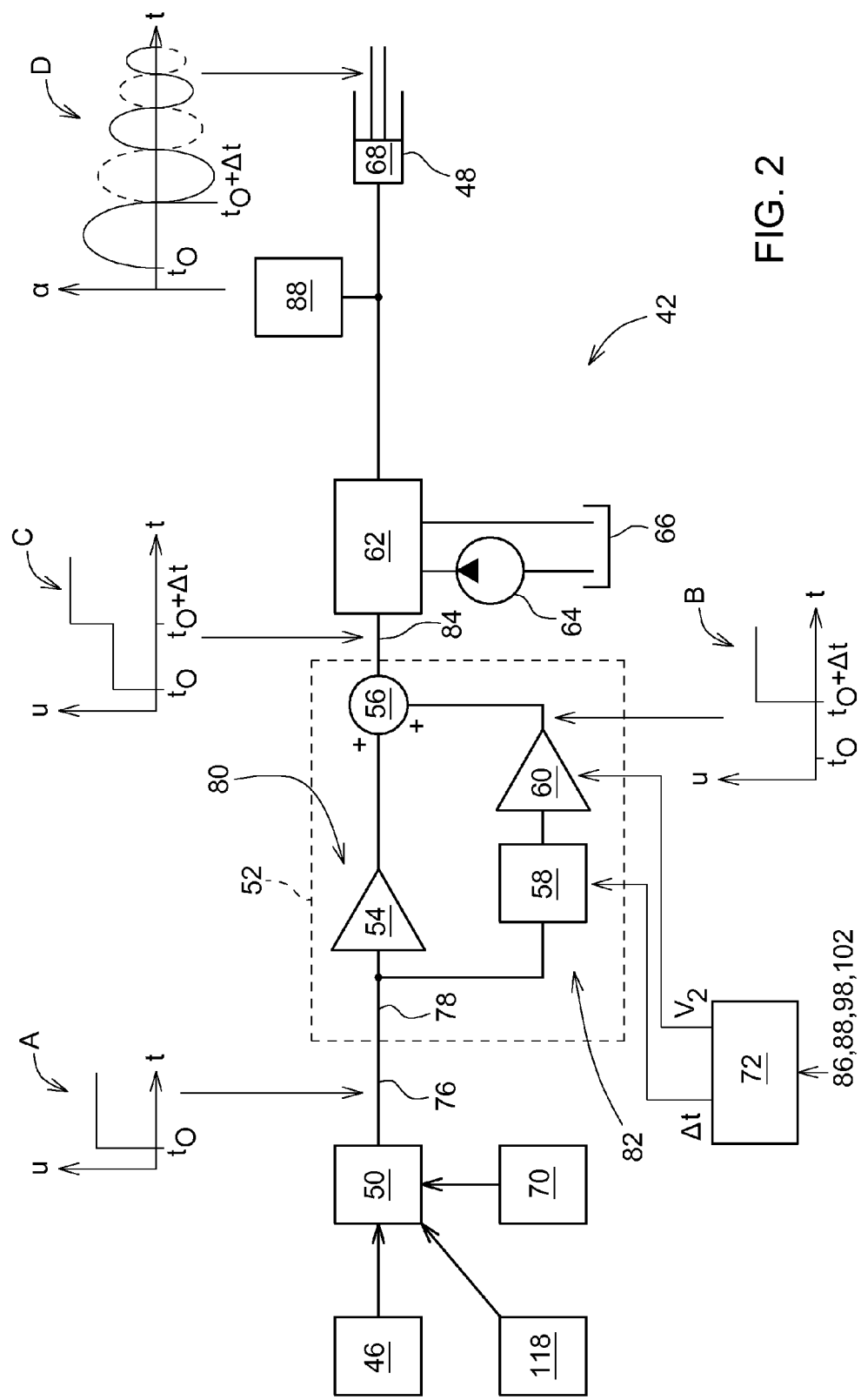
FIG. 2 shows a schematic representation of the apparatus for triggering an actuator for adjusting the adjustable element.

The reader is now referred to FIG. 2, in which the controller 42 is shown in detail. The controller 42 comprises a specifying device 50, which is connected to the user interface 46, the height sensor 118 and the look-ahead sensor system 70. The specifying device 50 continuously generates adjustment commands during operation, which it outputs at an output 76. These adjustment commands are dimensioned in a conventionally known manner such that the harvester head 16 is guided at a level above the ground that at least approximately corresponds to the height preset with the user interface 46. The signals of the height sensor 118 are used as feedback signals, and the signals of the look-ahead sensor system 70 are used to adjust the harvester head 16 at the proper time (looking ahead) before it reaches rising or falling parts of the field.

The adjustment commands at the output 76 of the specifying device 50 are fed to the input 78 of a signal-shaping arrangement 52. The signal-shaping arrangement 52 comprises a first branch 80 having a first amplifier 54, the input of which is connected to the input 78 and the output of which is connected to a first input of an adder 56, and a second branch 80 having a signal delay unit 58, the input of which is connected to the input 78 and the output of which is connected to the input of a second amplifier 60, the output of which is in turn coupled to a second input of the adder 56. The output of the adder 56 is simultaneously the output 84 of the signal-shaping arrangement 52. The signal shaping arrangement 52 can be implemented in analog or digital manner and can operate in the time domain or in the frequency domain.

The output 84 of the signal shaping arrangement 52 is connected to a control device 62, which is an electrohydraulic unit with (proportional or pulse-width coded) valves for controlling the position of the actuator 48. The control device 62 is connected to a pump 64 for supplying pressure to the piston chamber 68 of the actuator 48 and to a hydraulic reservoir 66, from which the pump 64 is fed. The signals supplied to the control device 62 at the output 84 of the signal shaping arrangement 52 are lowering or lifting signals, which are converted by the control unit 62 into appropriate driving signals for the valves thereof in order to retract or extend the actuator 48 in response to the signals. The polarity and level of the signal at the output 84 specifies the direction and speed of the adjustment by the actuator 48, and the time duration of the signal specifies the time duration of the activation of the actuator 48.

The mode of operation of the controller 42 is as follows. When the specifying device 50 outputs an adjustment command for raising the harvester head 16, an adjustment command in the form of a square wave pulse is present at the output 76 of the specifying 50 device at a time t0 [sic; both t0 and $t_0$ are used in the text; $t_0$ is used in the figure], as shown in diagram A of FIG. 2. This adjustment command is amplified by the first amplifier 54 of the first branch 80 in the signal-shaping arrangement 52 merely with a predetermined first gain and is applied to the first input of the adder 56. In the second branch 82 of the signal-shaping arrangement 52, the adjustment command is first delayed by the signal delay unit 58 temporally by a time $\Delta t$ and is amplified in the second amplifier 60 with a predetermined second gain and applied to the second input of the adder 56. Accordingly, an amplified square wave pulse, which is delayed relative to the square wave pulse present at the first input of the adder 56, is present at this second input of the adder 56, as shown in diagram B of FIG. 2. At the output 84 of the signal-shaping arrangement 52 there is therefore a step-like signal, which increases rectangularly at time t0 and once again increases at time t0+$\Delta t$, as illustrated by diagram C of FIG. 2. In mathematical terms, the signal shaping arrangement 52 performs a convolution of the signal at its input 78 with a time-delayed amplified signal at its output 78.

This has the effect that the actuator 48 carries out a movement sequence with the harvester head 16 in which the actuator is first activated at time t0. Thereby the system consisting of harvester head 16 and working machine 10 is placed in an oscillation state based on its mechanical properties; it begins to oscillate at its natural frequency. At time t0+$\Delta t$, the actuator 48 is once again activated (in the same direction as at time t0), i.e. the system consisting of harvester head 16 and working machine 10 is once again impacted (at a time at which the natural oscillation has just finished its first semi-oscillation). The oscillation already present and the oscillation induced at time $t_0$+$\Delta t$ then cancel one another out and the system consisting of harvester head 16 and working machine 10 comes to rest. This situation is shown in diagram D of FIG. 2: the solid line represents the acceleration a of the harvester head 16 due to the excitation at time t0, and the dashed line is the acceleration of the harvester head 16 only due to the excitation at time $t_0$+$\Delta t$. Because the two speeds cancel one another out, the system consisting of harvester head 16 and working machine 10 will no longer oscillate significantly at time $t_0$+$\Delta t$.

After the end of the adjustment movement of element 16, i.e. when the level sensor 118 reports to the specifying device 50 that the element 16 (and thus the actuator 48) has reached a target position, so that the output signal of the specifying device 50 falls to zero, the signal-shaping arrangement 52 will issue (analogously to diagram C in FIG. 2) a step-shaped but falling signal to the control device 62, the second stage which will again damp the oscillations that would otherwise arise at the end of the adjustment movement.

The time delay $\Delta t$ of the signal delay unit 58 thus matches as closely as possible the time duration of a semi-oscillation of the system consisting of harvester head 16 and working machine 10. The gains of the first and/or second amplifiers 54, 60 are selected such that the described cancellation of the system's natural oscillation will result. The aforementioned gain and delay depend on the natural frequency and the damping of the system consisting of harvester head 16 and working machine 10. Since the natural frequency and the damping of the system consisting of harvester head 16 and working machine 10 depend, among other things, on the nature of the harvester head 16 (type, model, width, etc.), a determination device 72 is provided in the present embodiment, which specifies the gain V2 of the second amplifier 60 and the time delay Δt of the signal delay unit 58. The determination device 72 could also specify the gain V1 of the first amplifier 54, although this is not absolutely necessary.

The determination device 72 is connected to a sensor 86, which is a vibration, acceleration or inertia sensor and is mounted on the inclined conveyor 18. The determination device 72 is additionally connected to a pressure sensor 88, which detects the pressure in the line between the control device 62 and the piston chamber 68 of the actuator 48. Before the start of a harvesting process, the determination device 72 can cause the control device 62 (via a connection not shown in FIG. 2) to carry out the calibration of the actuator 48. Then, the oscillation according to the solid curve in diagram D in FIG. 2 results, which can be picked up by means of the sensor 86 and/or the pressure sensor 88 and is present at the determination device 72. From this, the determination device 72 derives the resonant frequency and damping of the system consisting of harvester head 16 and harvesting machine 10, and from the latter (or directly, i.e. without an intermediate step using the resonant frequency and damping) derives the gain V2 of the second amplifier 60 and the time duration Δt of the signal delay unit 58.

The determination device 72 can additionally be connected to a pressure sensor for detecting the pressure in one or both of the front wheels 14. This pressure influences the resonant frequency and damping of the system consisting of harvester head 16 and harvesting machine 10. The consideration of the pressure output signals can thus be used if necessary during operation to modify the gain V2 of the second amplifier 60 and the time delay Δt of the signal delay unit if the tire pressure changes. The fill level in the grain tank 28 and/or in the fuel tank (not shown) analogously influences the resonant frequency and damping of the system consisting of harvester head 16 and harvesting machine 10, and can thus be detected by a sensor 102, signals of which are used by the determination device 72 (on the basis of known relationships stored in the determination device 72) in order to fine-tune the gain V2 of the second amplifier 60 and the time delay Δt of the signal delay unit 58. Signals from the sensor system 70 can likewise be used to derive a parameter of the field ground (e.g. hardness or resistance) in order to derive therefrom an influence on the resonant frequency and damping of the system consisting of harvester head 16 and harvesting machine 10 and thus to fine-tune the gain V2 of the second amplifier 60 and the time delay Δt of the signal delay unit 58 by using the determination device 72.

To parameterize the determination device 72, which is necessary in order to determine the natural frequency of the harvester machine-head unit and the damping thereof, it is possible to use methods presented in the literature (An Adaptive Input Shaping Control Scheme for Vibration Suppression in Slewing Flexible Structures; Anthony Tzes, Stephen Yurkovich; IEEE Transactions on Control Systems Technology, Vol. 1 No. 2, June 1993; and A Frequency Domain Identification Scheme for Flexible Structure Control, Anthony Tzes, Stephen Yurkovich; Proceedings of the 27th Conference on Decision and Control, Austin, Tex., 1968). These methods include a recursive least-square estimation and associated and extended methods (time-varying transfer function estimation, recursive least-mean-square) and adaptive filters in the time and frequency domain. The parameterization can be performed before and/or during operation. It is advantageous because there are different combinations of harvesting machines and harvester heads. In addition, damping and natural frequency are dependent on tire parameters, ground parameters, grain tank fill level, diesel fuel tank level and additional machine parameters/data, as described. Embodiments are also conceivable, however, in which the damping and natural frequency are fixedly predetermined or in which the damping and natural frequency are evaluated in the manner described above based only on sensors 86 and/or 88, but without using separate sensors for tire parameters, ground parameters, grain tank level and/or diesel fuel tank level etc.

Various modifications of the described embodiments are possible. Thus the determination device 50 can generate the adjustment commands on the basis of values derived from a map of the field (cf. WO 2008/088916 A2). The specifying device 50 can also use the fill level of the grain tank 28 and/or the fuel tank (sensor 102), because this fill level influences the height of the front axle and possibly the rear axle above the ground due to tire deformation and penetration into the ground. The specifying device can also use the signals of the sensor 86 (which supplements or replaces the height sensor 118) and/or the sensor 88 if a contact pressure control of the harvester head 16 is to be performed.

An actuator (not shown) can also be used to pivot the harvester head 16 relative to the inclined conveyor 18 about an axis running in the forward direction V in order to align the harvester head parallel to the ground (cf. WO 2008/088916 A2). This actuator would be triggered by a controller that is constructed and operates analogously to that of FIG. 2.

In another embodiment, the adjustable element is an implement attached to a front or rear power lift of a tractor, or a sprayer boom, height-adjustable and/or pivotable about an axis extending in the forward direction, of a self-propelled field sprayer, or an ejection pipe of the forage harvester that is adjustable about a vertical and/or a horizontal axis.

What is claimed is:

1. An apparatus for triggering an actuator for adjusting an adjustable element of an agricultural working machine, the apparatus comprising:
   a control arrangement for the actuator coupled to the adjustable element; and
   at least one controller comprising:
   a specifying device configured to generate adjustment commands for the adjustable element in order to travel to a target position;
   a determination device configured to receive first signals regarding at least one of a tire parameter and a fill level of a container of the agricultural working machine, the determination device further configured to receive second signals regarding at least one of:
   a pressure in a hydraulic cylinder provided as the actuator;
   a movement of the adjustable element; and
   an electrical triggering of an electrical actuator; and
   a signal-shaping unit comprising an input connected to the specifying device, an output connected to the control arrangement to actuate the actuator, a first branch connected to the input and output and configured to transmit the adjustment command from the input with a first gain to the output, and a second branch connected to the input and configured to transmit the adjustment command from the input through a signal delay unit and with a second gain to the output;

wherein:

the determination device is configured to determine, before a start of or during an operation of the agricultural working machine, dependent on the second signals, data regarding at least one of a resonant frequency or a damping factor of a system comprising the agricultural working machine and the adjustable element; and the determination device is configured to at least one of fine-tune or modify, dependent on the first signals, the data then specify at least one of the second gain or a time delay of the signal delay unit based on the fine-tuned or modified data.

2. The apparatus of claim 1, wherein the specifying device is configured to generate adjustment commands based on output values of sensors that are look-ahead or are mechanically connected to the ground, or based on values derived from a map.

3. The apparatus of claim 2, wherein the specifying device is configured to generate adjustment commands further based on the second signals.

4. The apparatus of claim 1, wherein the adjustable element is an implement mounted on at least one of:

a front or rear power lift of a tractor;

a front or rear power lift of a sprayer boom;

a forage harvester ejection pipe that is adjustable about a vertical or a horizontal axis;

a harvester head of a harvesting machine, and adjustable in a forward direction;

a harvester head of a harvesting machine, and adjustable transversely thereto; or a self-propelled field sprayer and is height adjustable or pivotable about an axis extending in a forward direction of the self-propelled field sprayer.

5. A method for damping vibration of an implement attached to an agricultural working machine, the method comprising:

receiving an adjustment command for movement of the implement;

receiving first signals regarding at least one of a tire parameter and a fill level of a container of the agricultural working machine;

receiving second signals regarding at least one of a pressure of a hydraulic actuator coupled to the implement, a movement of the implement, and an electrical triggering of an electrical actuator coupled to the implement;

determining a first control signal using the adjustment command;

determining, using the second signals, at least one of a resonant frequency or a damping factor of a system comprising the agricultural working machine and the implement;

modifying, using the first signals, the determined at least one of the resonant frequency or the damping factor;

determining, using the modified at least one of the resonant frequency or the damping factor, at least one of a gain and a time offset;

determining a second control signal using the adjustment command, the gain, and the time offset; and controlling at least one of the hydraulic actuator or the electrical actuator using the first control signal and the second control signal, the implement moveable by the actuator.

* * * * *